(12) United States Patent
Nakagawa et al.

(10) Patent No.: US 7,971,770 B2
(45) Date of Patent: Jul. 5, 2011

(54) FRICTION STIR METHOD

(75) Inventors: Koichi Nakagawa, Tokyo (JP); Qing Liu, Shenzhen (CN); Isao Shiozawa, Tokyo (JP); Takeo Nakagawa, Tokyo (JP)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW); FINE TECH Corporation, Tokyo (JP)

( * ) Notice: Subject to any disclaimer, the term of this patent is extended or adjusted under 35 U.S.C. 154(b) by 0 days.

(21) Appl. No.: 12/750,883

(22) Filed: Mar. 31, 2010

(65) Prior Publication Data
US 2011/0132970 A1    Jun. 9, 2011

(30) Foreign Application Priority Data
Dec. 3, 2009    (CN) .......................... 2009 1 0310848

(51) Int. Cl.
*B23K 20/12*    (2006.01)

(52) U.S. Cl. ...................... 228/112.1; 228/2.1; 148/564

(58) Field of Classification Search ............... 228/112.1, 228/2.1, 155–163; 428/615; 72/68, 57, 709; 148/564, 527, 902, 907
See application file for complete search history.

(56) References Cited

U.S. PATENT DOCUMENTS

| | | | | |
|---|---|---|---|---|
| 6,045,028 A | * | 4/2000 | Martin et al. | 228/112.1 |
| 6,460,752 B1 | * | 10/2002 | Waldron et al. | 228/112.1 |
| 6,598,778 B2 | * | 7/2003 | Konno et al. | 228/112.1 |
| 6,712,916 B2 | * | 3/2004 | Mishra et al. | 148/564 |
| 6,739,495 B2 | * | 5/2004 | Okamura et al. | 228/112.1 |
| 6,866,180 B2 | * | 3/2005 | Mahoney et al. | 228/112.1 |
| 7,455,212 B2 | * | 11/2008 | Mika | 228/112.1 |
| 2003/0005852 A1 | * | 1/2003 | Okamura et al. | 105/396 |
| 2009/0236028 A1 | * | 9/2009 | Fukuda | 156/73.5 |

\* cited by examiner

*Primary Examiner* — Roy King
*Assistant Examiner* — Michael Aboagye
(74) *Attorney, Agent, or Firm* — Clifford O. Chi (57) ABSTRACT

A friction stir method includes providing a joining tool, a mold comprising a top surface and a cutout defined from the top surface, and a workpiece comprising a treatable layer and arranged on the top surface of the mold. The joining tool resists the workpiece, and rotates and moves to agitate the treatable layer of the workpiece along an extending direction of the cutout of the mold, until a protrusion integrated with the workpiece is formed in the cutout of the mold.

19 Claims, 14 Drawing Sheets

FRICTION STIR METHOD

CROSS-REFERENCE TO RELATED APPLICATIONS

This application is related to three co-pending U.S. patent applications, which are: application Ser. No. 12/729,407, filed on Mar. 23, 2010, and entitled "FRICTION STIR WELDING METHOD AND FRICTION STIR WELDED HOUSING", application Ser. No. 12/728,387, filed on Mar. 22, 2010, and entitled "FRICTION STIR WELDING METHOD", application Ser. No. 12/750,890, and entitled "FRICTION STIR WELDING METHOD AND FRICTION STIR WELDED HOUSING". In Ser. No. 12/729,407, Ser. No. 12/728,387, Ser. No. 12/750,890, the inventors are Koichi Nakagawa, Qing Liu, Isao Shiozawa, and Takeo Nakagawa, the assignee is HONG FU JIN PRECISION INDUSTRY (ShenZhen) CO., LTD, Hon HAI PRECISION INDUSTRY CO. LTD and FINE TECH Corporation.

BACKGROUND

1. Technical Field

The present disclosure generally relates to component fabrication, and particularly, to a friction stir welding method using a joining tool without a mixing pin.

2. Description of Related Art

Often, protrusions or depressions are formed on a metallic plate or elastic plate by, cutting to remove material from the plate, combining separate elements, or deforming an element using a predetermined mold. The cutting method provides products with a complex shape, but production efficiency is relatively low. Production efficiency of the combining and the deforming methods is relatively high, but it is difficult to provide products with complex shape. Thus, different methods are selected according to different requirements.

Patterns on a mold may be printed on a plate by stamping or forging. However, stamping force should correspond to a transferring area, thus a strong stamping force is needed. Therefore, the stamping method can only be used on small plates. Even so, the stamping force applied on a part of the plate may bend and warp the plate.

In order to decrease the requirement for stamping force in the stamping method, the entire plate may be heated to soften. However, it is inconvenient to apply the heating process to the entire plate if it is a large sized plate. Therefore, a method of heating a part of the plate is promoted. However, the plate may partially expand after heating, with internal stresses generated after the partially heated plate is cooled. As a result, the plate can bend and deform. It can be seen that, for a plate of relatively large size, problems occur in formation of protrusions and depressions thereon.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
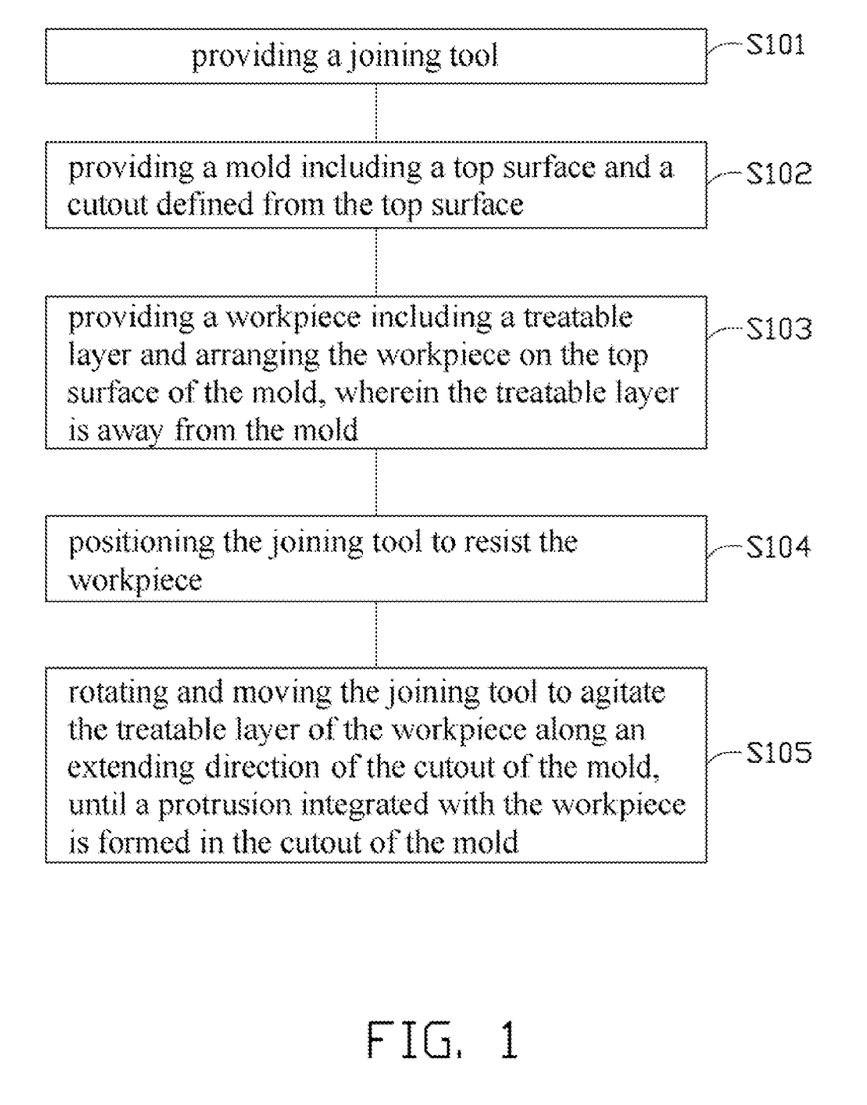
FIG. 1 is a flowchart of one embodiment of a friction stir welding method as disclosed.
Figure 2:
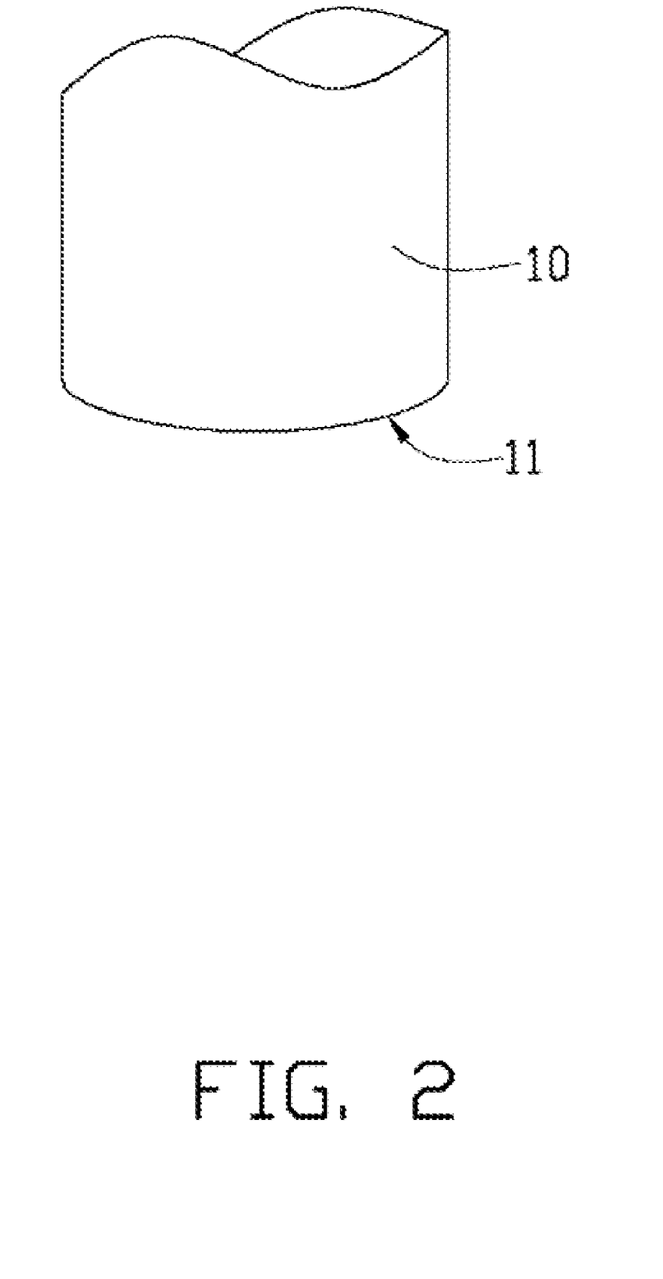
FIG. 2 is a partial, isometric view of a joining tool used in the friction stir welding method of FIG. 1.
Figure 3:
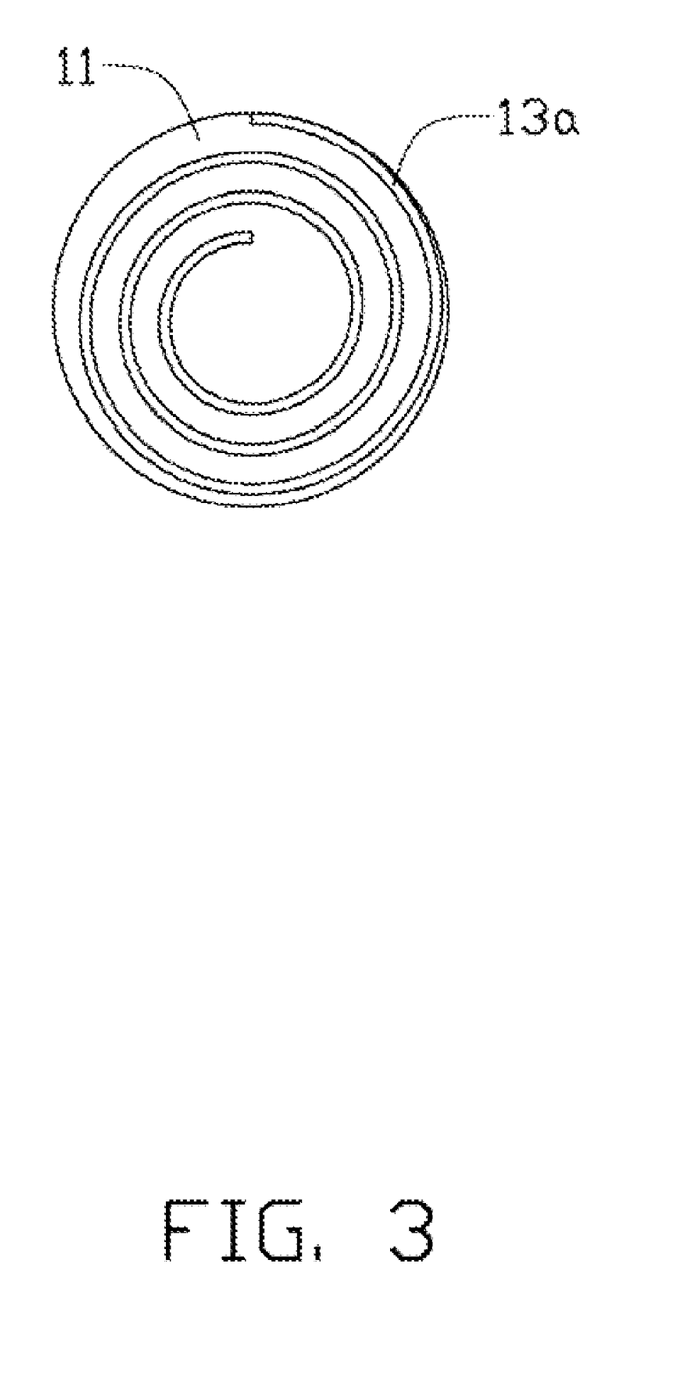
FIG. 3 is a bottom view of the joining tool of FIG. 2 used in the friction stir welding method of FIG. 1.
Figure 4:
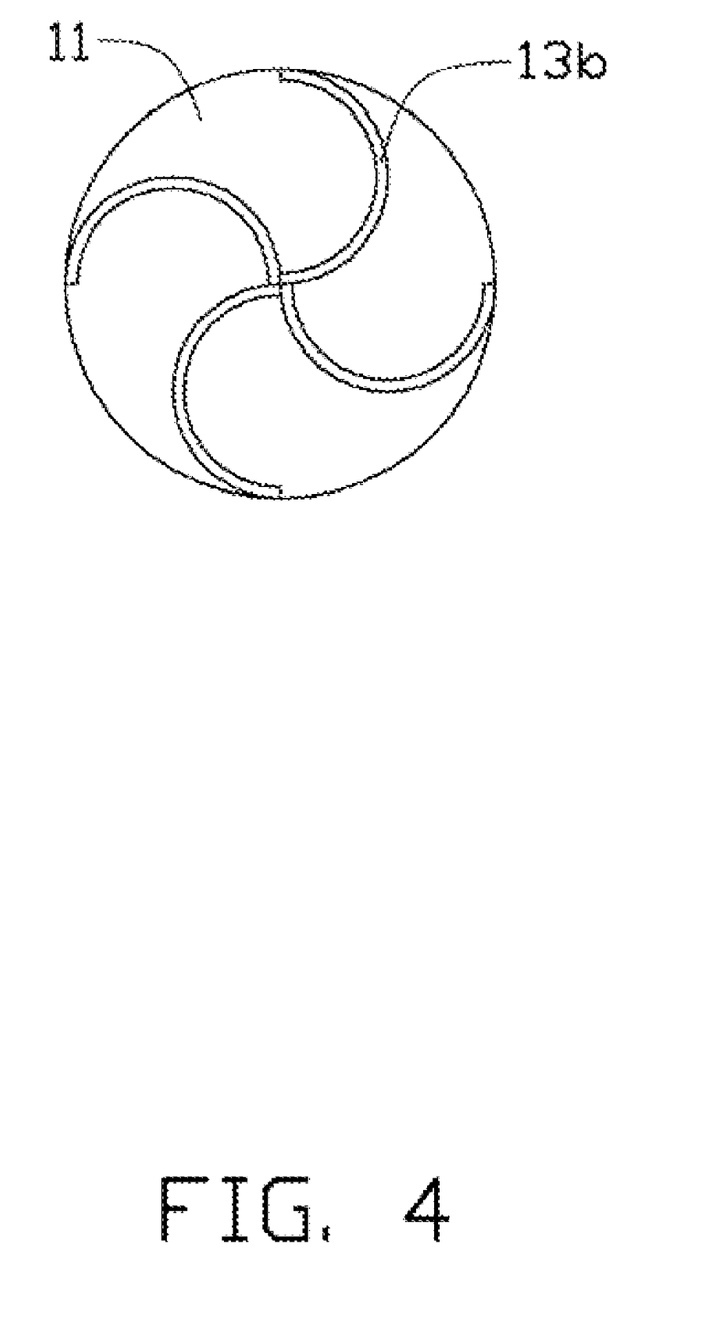
FIG. 4 is a bottom view of another joining tool used in the friction stir welding method of FIG. 1.

FIG. 1 is a flowchart of one embodiment of a friction stir welding method. Referring to FIG. 2, a joining tool 10 used in the method is shown. The joining tool 10 is substantially cylindrical and includes a friction surface 11. The friction surface 11 is substantially flat. The joining tool 10 defines a slot in the friction surface 11. In one embodiment, the slot 13a may be spiral as shown in FIG. 3, and in another embodiment, may include a plurality of curved slots 13b extending from a rotation axis of the joining tool 10 to a periphery of the friction surface 11, as shown in FIG. 4.

Figure 5:
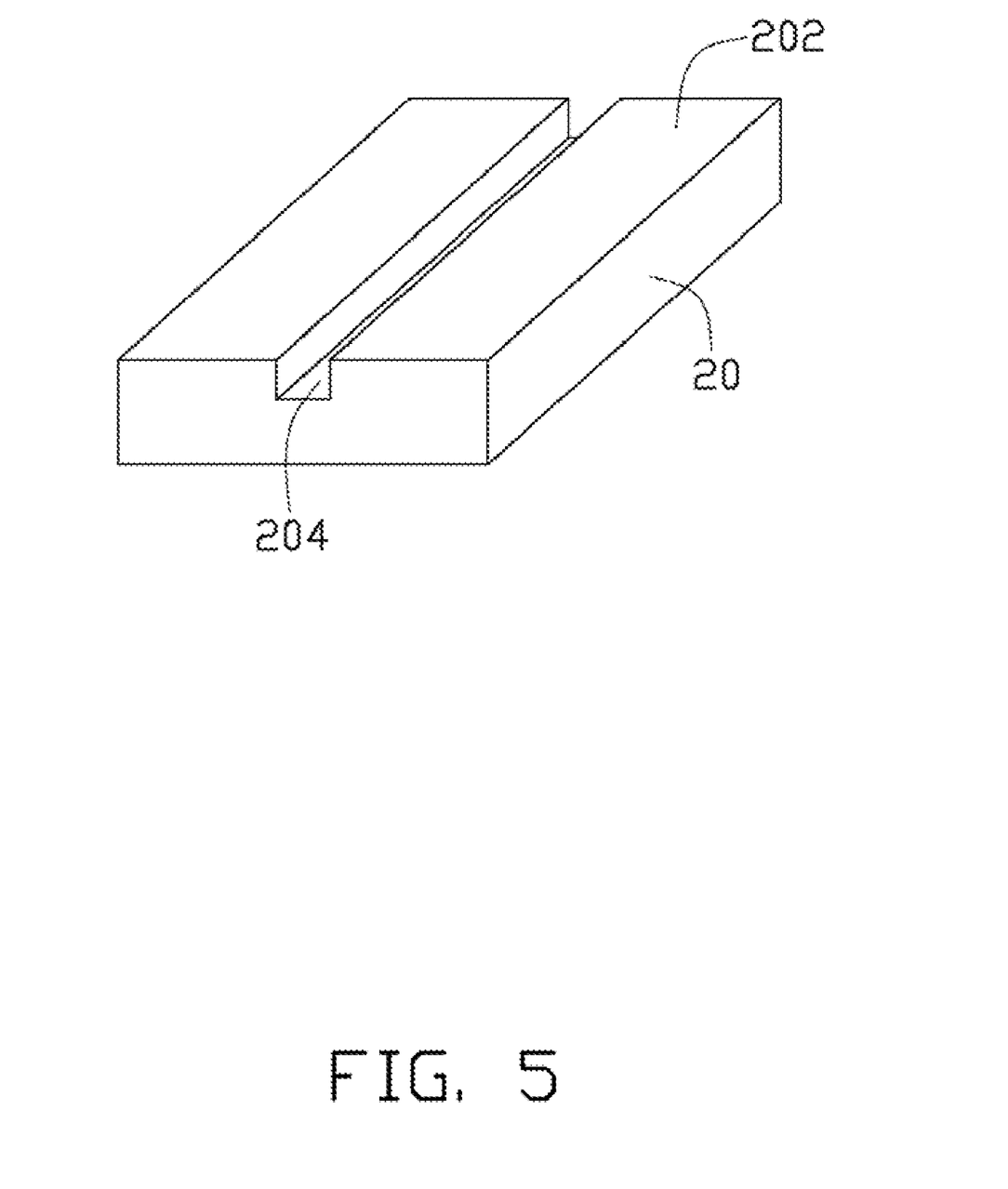
FIG. 5 is an isometric, schematic view of a mold applied in the friction stir welding method of FIG. 1.

Referring to FIG. 5, a mold 20 is provided. The mold 20 includes a top surface 202 and defines a cutout 204 in the top surface 202. The top surface 202 may be shaped to conform to a desired product, such as flat or curved.

Figure 6:
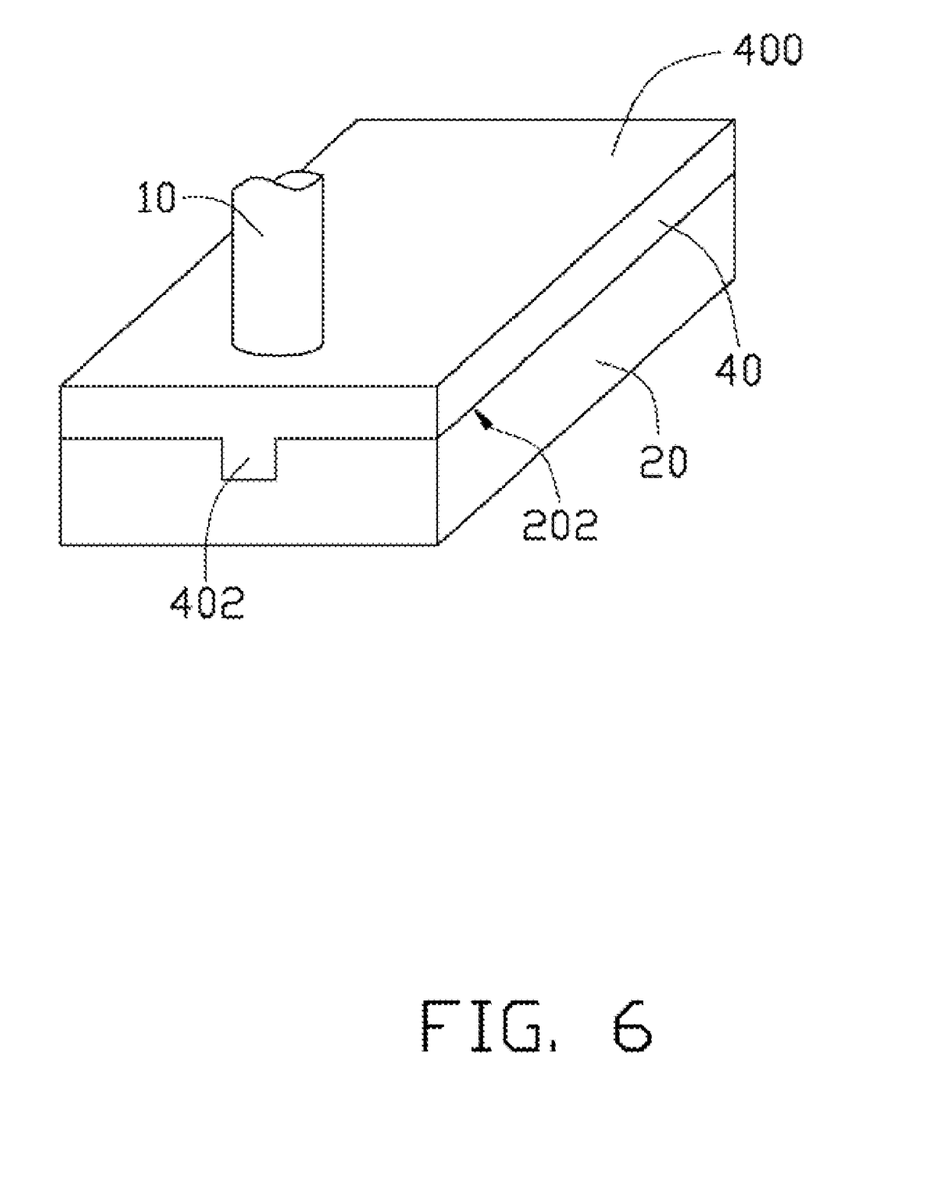
FIG. 6 is an isometric, schematic view of a joining tool friction stirring a workpiece on the mold of FIG. 5.
Figure 7:
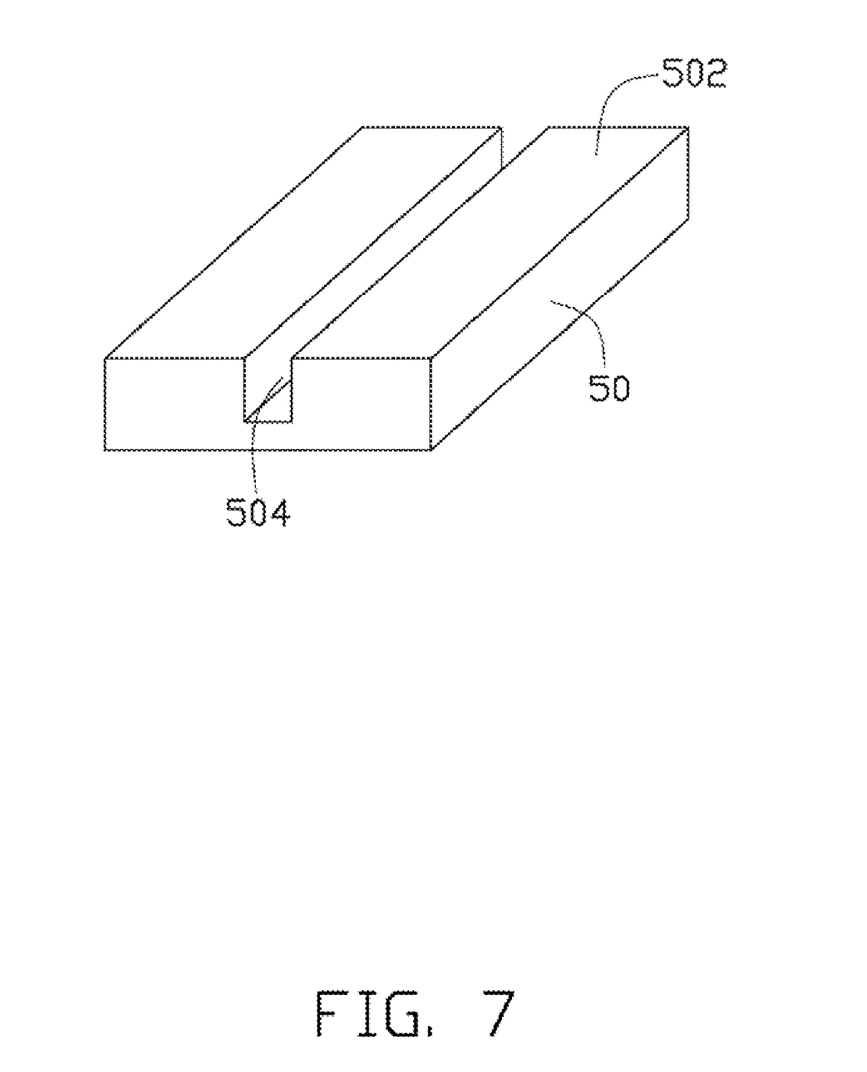
FIG. 7 is an isometric, schematic view of another mold applied in the friction stir welding method of FIG. 1.
Figure 8:
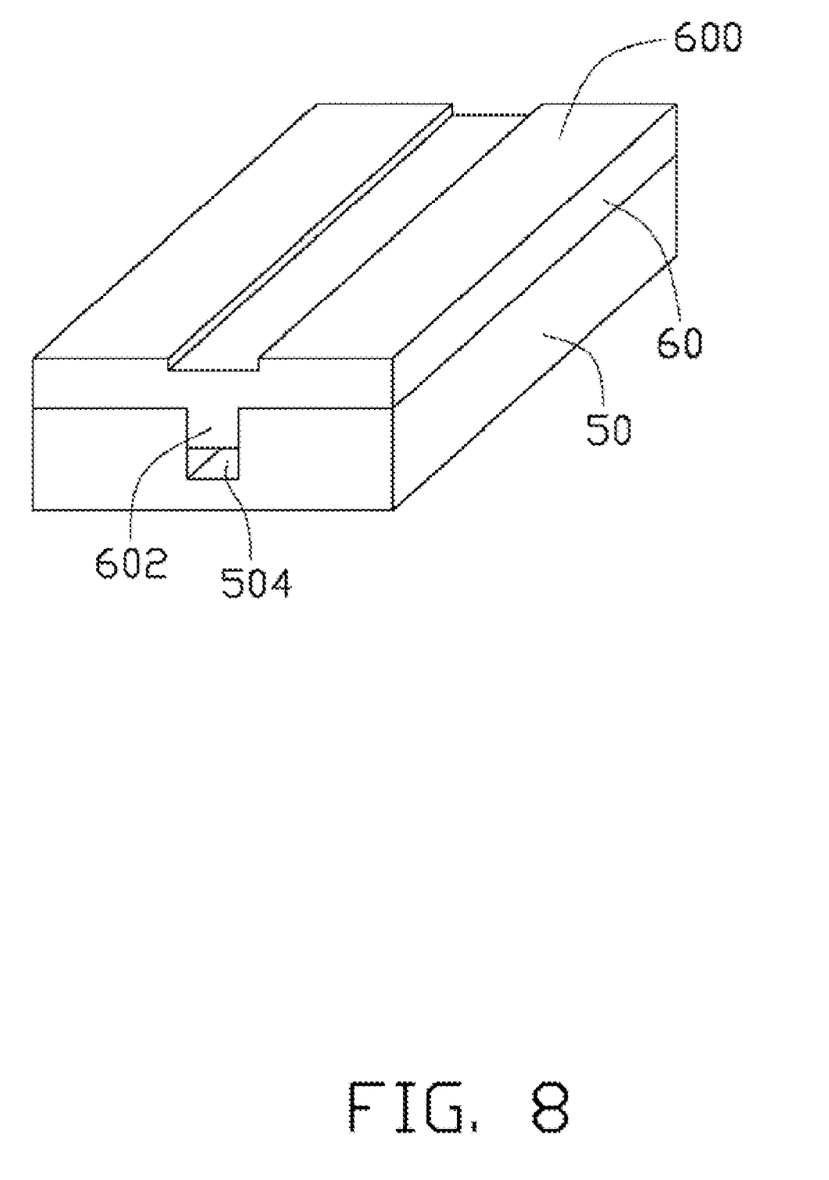
FIG. 8 is schematic view showing a state of a workpiece after processed by the friction stir welding method of FIG. 1 with the mold of FIG. 7.
Figure 9:
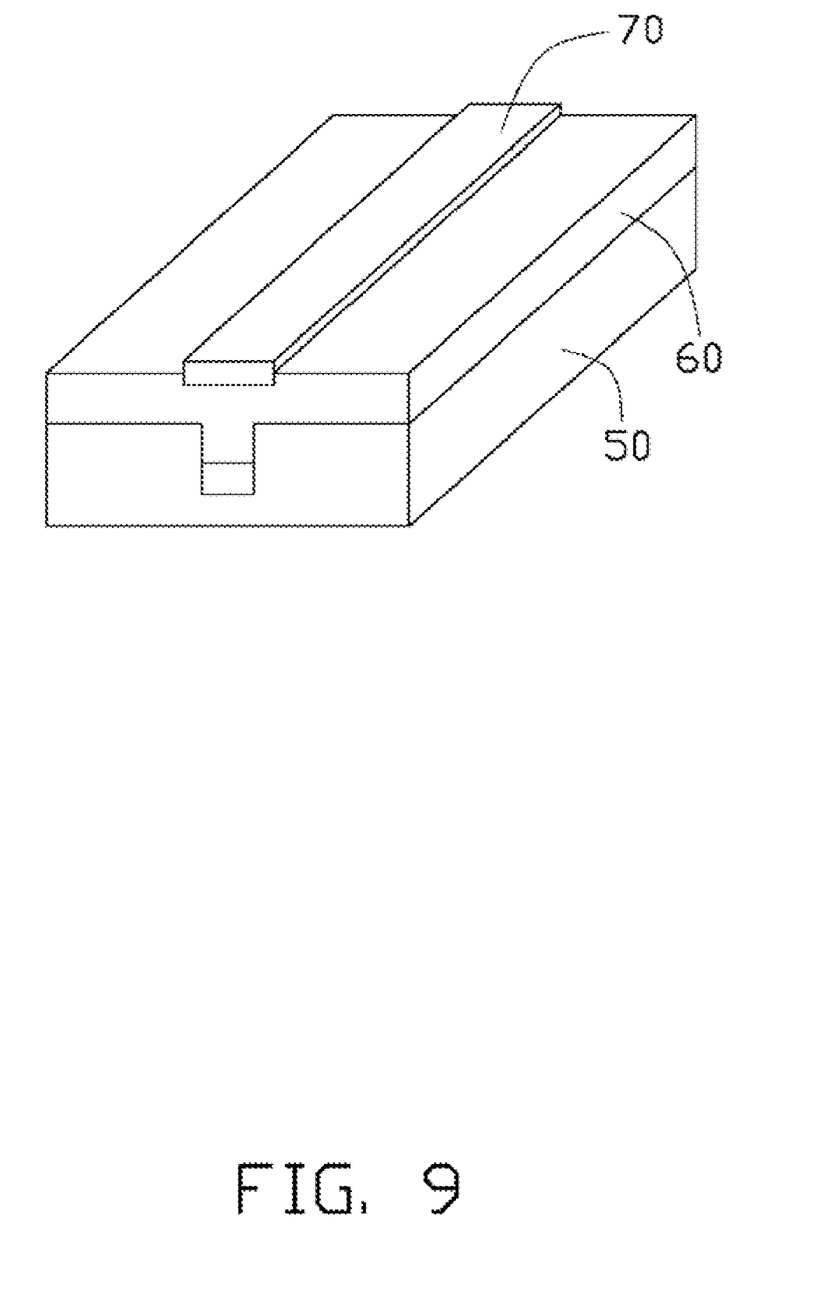
FIG. 9 is a schematic view showing a second state of the workpiece of FIG. 8 with the mold of FIG. 7.
Figure 10:
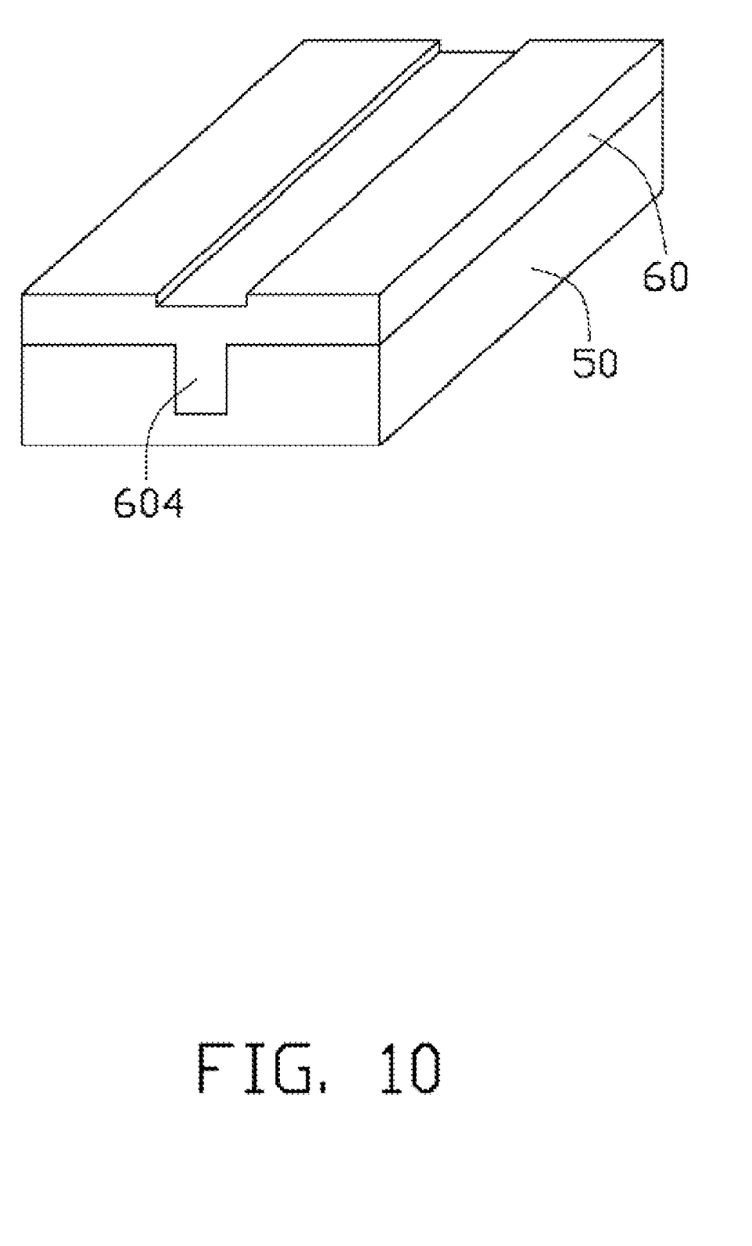
FIG. 10 is schematic view showing a third state of the workpiece of FIG. 8 with the mold of FIG. 7.
Figure 11:
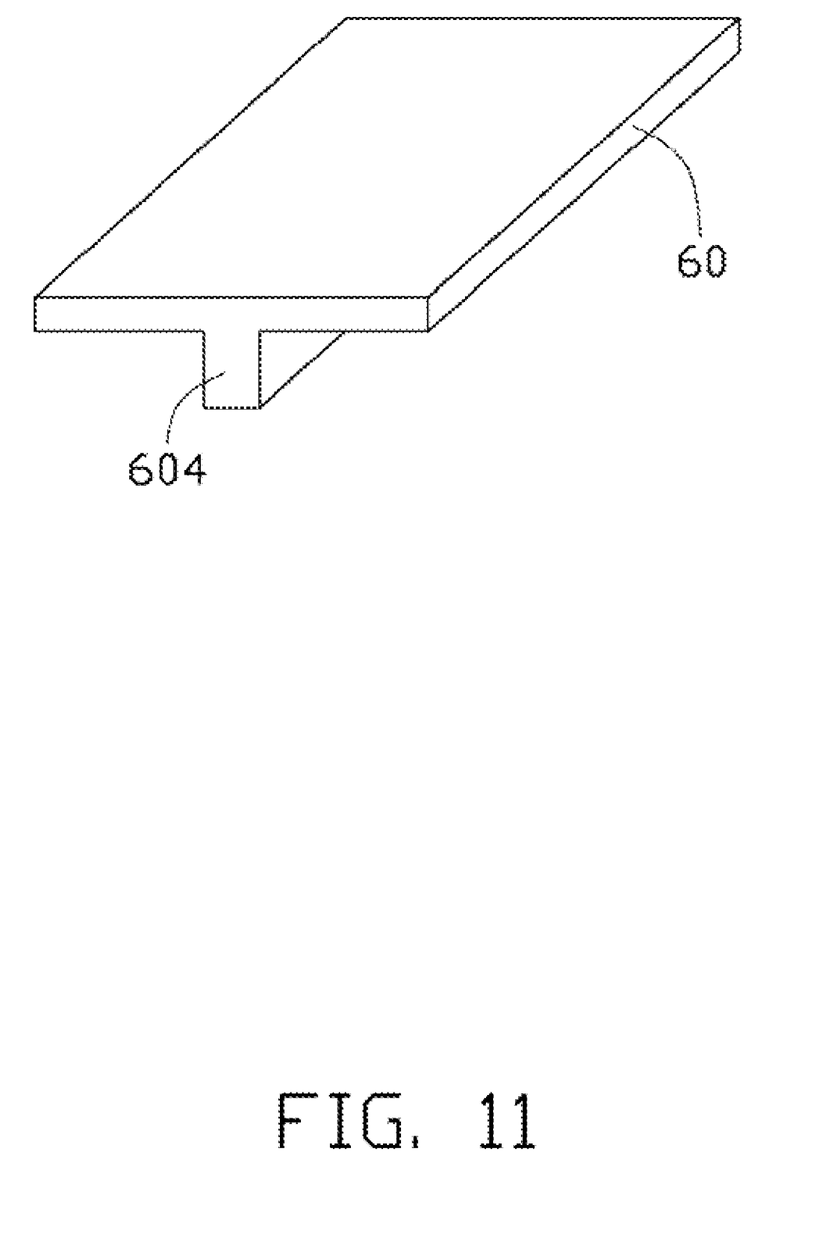
FIG. 11 is an isometric schematic view of the workpiece of FIG. 8 after friction stir welding.

Referring to FIG. 6, a workpiece 40 is provided. The workpiece 40 is a plate having a treatable layer 400.

Referring to FIGS. 1 through 6, one embodiment of a friction stir welding method includes the following steps. In step S101, a joining tool 10 is provided. In step S102, a mold 20 is provided, the mold 20 including a top surface 202 and defining a cutout 204 therein. In step S103, a workpiece 40 including a treatable layer 400 is disposed on the top surface 202 of the mold 20. The treatable layer 400 is away from the top surface 202. In step S104, the friction surface 11 of the joining tool 10 resists the treatable layer 400 of the workpiece 40. In step S105, the joining tool 10 rotates and moves to agitate the treatable layer 400 of the workpiece 40 corresponding to an extending direction of the cutout 204 of the mold 20, the joining tool 10 agitates the surface layers of the workpiece 40, and a material of the treatable layer 400 corresponding to the cutout 204 is agitated, until a protrusion 402 integrated with the workpiece 40 is formed therein.

During the friction stir process, heat generated by friction and stirring is transferred to the unstirred material adjacent to the mold 20. The joining tool 10 produces a local region of highly plasticized material such that material of the workpiece 40 flows into the cutout 204. As such, the protrusion 402 is formed on the workpiece 40. A stamping trail pressed by the joining tool 10 may be left on the treatable layer 400 of the workpiece 40. Parts of the workpiece 40 may be removed to acquire a flat surface.

The friction stir welding method as disclosed can machine a thick workpiece. However, if the workpiece is very thick, and the volume of the depressed portion of the workpiece 40 is larger than that of the cutout 204 of the mold 20, the material of the workpiece 40 around the joining tool 10 may protrude from the treatable layer 400. Therefore, the protruding portion of the workpiece 40 must be removed. The joining tool 10 can move along the cutout 204 of the mold 20 or other directions, thus, the material of the workpiece 40 may fill in the cutout 204 of the mold 20 effectively.

When the material of the workpiece 40 fills a part of the cutout 204 of the mold 20, hollow portions in the cutout 204 may remain, such as the bottom of the cutout 204, or the corner of the cutout 204. An assisting member (not shown) with the same material as the workpiece 40 may be filled in the hollow portions. The workpiece 40 and the assisting member may then continue to be joined by friction stir welding.

Referring to FIGS. 7 through 11, another mold 50 can also be used in the friction stir welding method. The mold 50 differs from the mold 20 disclosed in the first embodiment only in that the cutout 504 of the mold 50 is deeper than the cutout 204 of the mold 20 of the first embodiment. A workpiece 60 is provided, including a treatable layer 600.

In forming the workpiece 60 via the friction stir welding, the workpiece 60 is disposed on the top surface of the mold 50. The joining tool 10 resists the treatable layer 600 of the workpiece 60. The joining tool 10 rotates around an axis thereof and moves corresponding to an extending direction of the cutout 504 of the mold 50. Thus the joining tool 10 agitates surface layers of the workpiece 60, such that material of the treatable layer 600 corresponding to the cutout 504 are agitated to form a protrusion 604. The depth of the cutout 504 of the mold 50 is very large such that the material can fill a part of the cutout 504. An assisting member 70 is arranged on the treatable layer 600 of the workpiece 60, the joining tool 10 rotates and moves again to join the workpiece 60 and the assisting member 70, and the material fills the cutout 504 of the mold 50 to form the protrusion 604. The material of the assisting member 70 is the same as the workpiece 60. The material of the treatable layer 600 of the workpiece 60 may be removed to achieve a flat surface.

Figure 12:
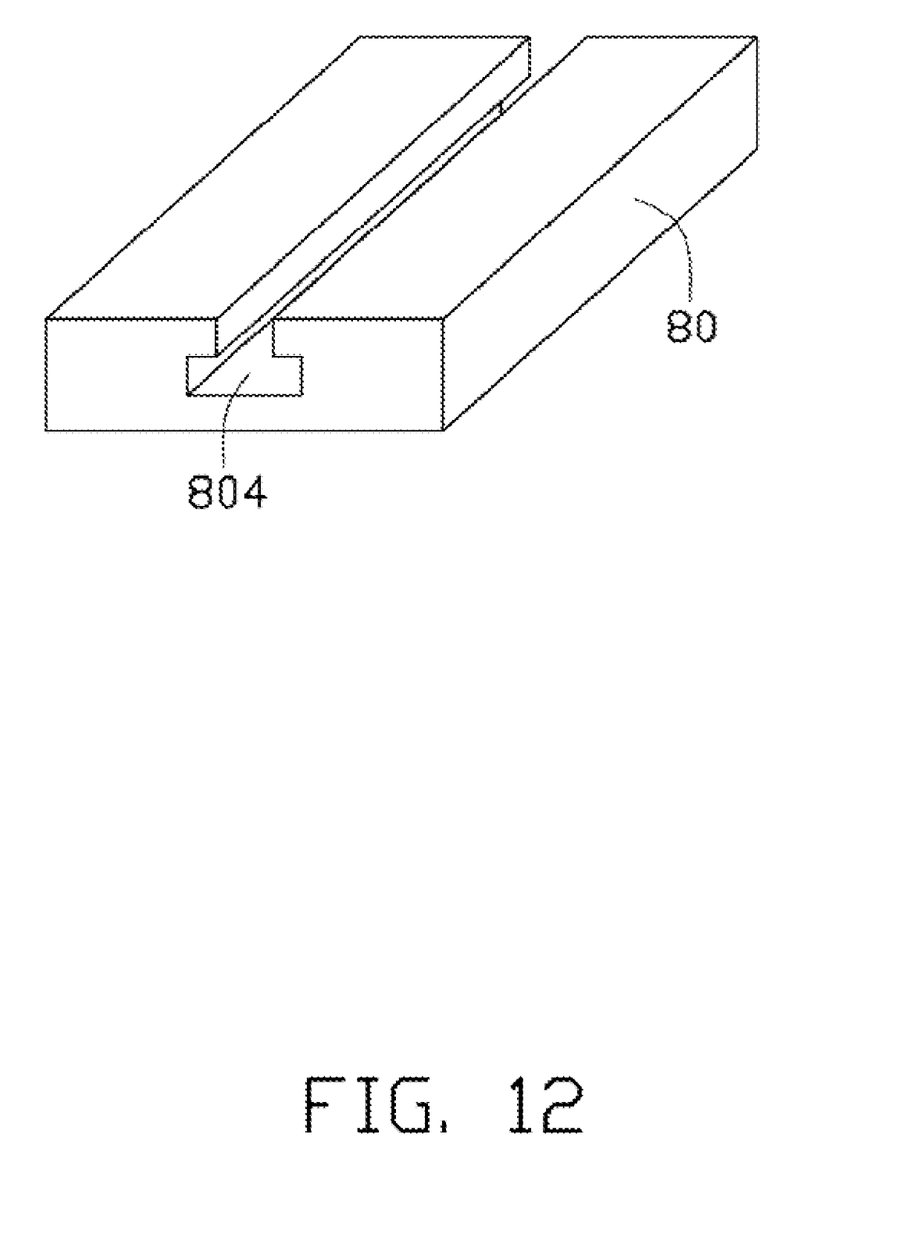
FIG. 12 is a schematic view of a third mold applied in the friction stir welding method of FIG. 1.
Figure 13:
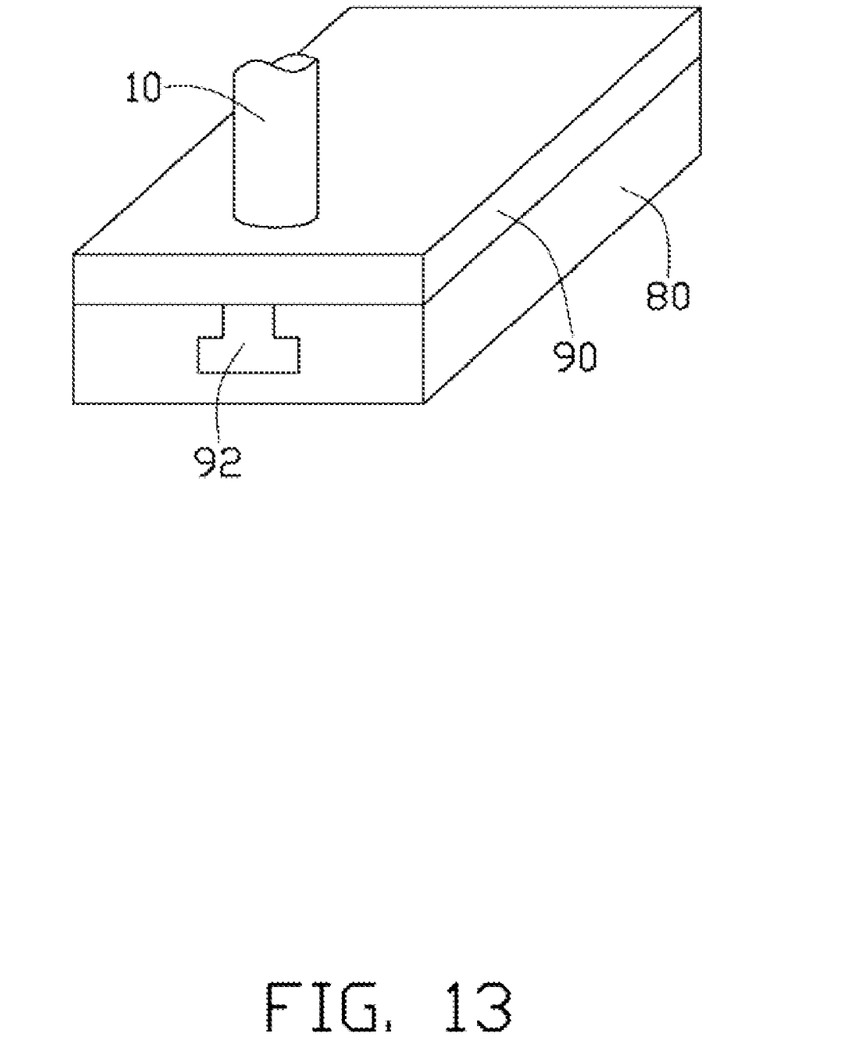
FIG. 13 is schematic view of a joining tool friction stirring a workpiece on the mold of FIG. 12.
Figure 14:
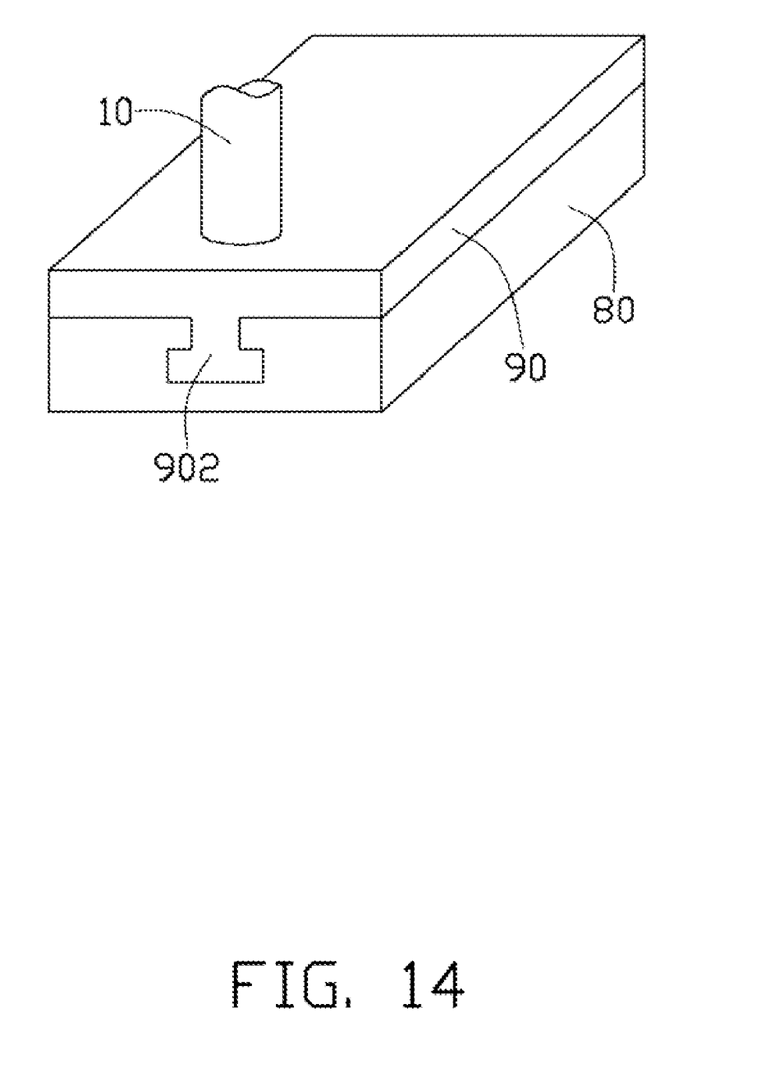
FIG. 14 is a second state of the joining tool friction stirring the workpiece on the mold of FIG. 12.

Referring to FIGS. 12 through 14, a third mold 80 can also be used in the friction stir welding method, differing from the mold 20 disclosed in the first embodiment only with respect to the shape of the cutout. The mold 80 defines a T-shaped cutout 804. An assisting member 92 is provided, having same shape as the cutout 804 of the mold 80, and snugly receivable in the cutout 804 of the mold 80. During formation of the workpiece 90 via the friction stir welding, the workpiece 90 is disposed on the top surface of the mold 80 defined in the treatable layer 800. The assisting member 92 is arranged in the cutout 804 of the mold 80, facing away from the top surface of the mold 80. The joining tool 10 resists the treatable layer 800 of the workpiece 90. The joining tool 10 rotates around an axis thereof and moves corresponding to an extending direction of the cutout 804 of the mold 80. Thus the joining tool 10 agitates parts of the workpiece 90 and parts of the assisting member 92, such that material of the workpiece 90 and the assisting member 92 plastically flow and join together. Thus, a protrusion 902 is formed on the workpiece 90. Material of the surface of the workpiece 90 may be removed according to actual requirements.

The friction surface 11 of the joining tool 10 may form a protrusion in the middle portion, and the protrusion may include a threaded slot to impel material along the slot, such that the material can fill in the cutouts 204, 504, 604, 804. Diameter of the joining tool 10 can be designed according the size of the cutouts 204, 504, 604, 804.

The workpieces 40, 60, 90 and the assisting members 70, 92 may have a low melting point, such as aluminum, aluminum alloy, copper alloy, or rubber, and be of any shape.

The friction stir welding methods as disclosed above share the following characteristics: the diameter of the joining tool can be designed very small, such that a correspondingly low driving force is required; cutting machining devices (not shown) with auto-exchanging tools can be used in the methods to machine the workpiece before or after welding; these methods can be used to form workpieces with different shapes easily; only parts of the workpiece are machined, thus the whole workpiece may have a good precision; when only a part of the cutout is filled, an assisting member can be used to fill in the cutout, thus, the methods can be used to form a protrusion with large sizes; the workpieces may picture some patterns if the mold includes some micro-pictures; the material of the assisting member may be different from the workpiece to achieve a new product; little material of the workpiece is removed after welded.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A friction stir method, comprising:
   providing a jointing tool;
   providing a mold comprising a top surface and a cutout defined from the top surface;
   providing a single workpiece comprising a treatable layer and arranging the workpiece on the top surface of the mold, wherein the treatable layer is away from the mold;
   positioning the joining tool to resist the workpiece; and
   rotating and moving the joining tool to agitate the treatable layer of the workpiece along an extending direction of the cutout of the mold, the jointing tool producing a local region of highly plasticized material of the only one single workpiece that flows into the cutout until a protrusion integrated with the only one single workpiece is formed in the cutout of the mold.

2. The friction stir method of claim 1, wherein heat generated during the rotation and movement of the joining tool, soften and melt parts of the workpiece which plastically flow into the cutout of the mold.

3. The friction stir method of claim 2, wherein if the protrusion only fills a part of the cutout of the mold, the method further comprises providing an assisting member positioned on the workpiece away from the mold, positioning the joining tool to resist the assisting member, and rotating and moving the joining tool along an extending direction of the cutout of the mold to agitate the assisting member until the cutout of the mold is fully filled.

4. The friction stir method of claim 3, wherein the material of the assisting member is aluminum.

5. The friction stir method of claim 3, wherein the material of the assisting member is aluminum alloy.

6. The friction stir method of claim 3, wherein the material of the assisting member is copper alloy.

7. The friction stir method of claim 3, wherein the material of the assisting member is rubber.

8. The friction stir method of claim 1, further comprising providing an assisting member with a shape substantially the same as that of the cutout of the mold, and positioning the assisting member in the cutout of the mold to integrate with the workpiece before friction stirring.

9. The friction stir method of claim 8, wherein the material of the assisting member is aluminum.

10. The friction stir method of claim 8, wherein the material of the assisting member is aluminum alloy.

11. The friction stir method of claim 8, wherein the material of the assisting member is copper alloy.

12. The friction stir method of claim 8, wherein the material of the assisting member is rubber.

13. The friction stir method of claim 1, further comprising removing material from the treatable layer of the workpiece after forming the protrusion.

14. The friction stir method of claim 1, wherein the cutout of the mold is T-shaped.

15. The friction stir method of claim 1, wherein the jointing tool has a friction surface resisting the treatable layer of the workpiece and defines a slot in the friction surface.

16. The friction stir method of claim 15, wherein the slot is spiral.

17. The friction stir method of claim 15, wherein the slot includes a plurality of curved slots extending from a rotation axis of the joining tool to a periphery of the friction surface.

18. The friction stir method of claim 15, wherein the friction surface of the joining tool forms a protrusion in the middle portion, and the protrusion includes a threaded slot to impel material along the slot, such that the material can fill in the cutouts.

19. The friction stir method of claim 1, wherein the diameter of the joining tool is designed according the size of the cutouts.

* * * * *

UNITED STATES PATENT AND TRADEMARK OFFICE
CERTIFICATE OF CORRECTION

| | | |
|---|---|---|
| PATENT NO. | : 7,971,770 B2 | Page 1 of 1 |
| APPLICATION NO. | : 12/750883 | |
| DATED | : July 5, 2011 | |
| INVENTOR(S) | : Koichi Nakagawa et al. | |

It is certified that error appears in the above-identified patent and that said Letters Patent is hereby corrected as shown below:

Title Page, Item (54) and at Column 1, line 1, please replace "TITLE" with the following:

-- FRICTION STIR WELDING METHOD --

Signed and Sealed this
Thirteenth Day of September, 2011

David J. Kappos
*Director of the United States Patent and Trademark Office*